US012000474B2

(12) United States Patent
Noguchi et al.

(10) Patent No.: US 12,000,474 B2
(45) Date of Patent: Jun. 4, 2024

(54) TOROIDAL CONTINUOUSLY VARIABLE TRANSMISSION AND DRIVE MECHANISM-INTEGRATED ELECTRICITY GENERATION APPARATUS FOR AIRCRAFT

(71) Applicant: KAWASAKI JUKOGYO KABUSHIKI KAISHA, Kobe (JP)

(72) Inventors: Yoshiyuki Noguchi, Kobe (JP); Yuji Shinoda, Kobe (JP); Kenji Komatsu, Kobe (JP); Hideyuki Imai, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 186 days.

(21) Appl. No.: 17/597,723

(22) PCT Filed: Jun. 25, 2020

(86) PCT No.: PCT/JP2020/025016
§ 371 (c)(1),
(2) Date: Jan. 20, 2022

(87) PCT Pub. No.: WO2021/014879
PCT Pub. Date: Jan. 28, 2021

(65) Prior Publication Data
US 2022/0252145 A1 Aug. 11, 2022

(30) Foreign Application Priority Data

Jul. 22, 2019 (JP) .................................. 2019-134698

(51) Int. Cl.
*F16H 57/04* (2010.01)
*B64D 41/00* (2006.01)
(Continued)

(52) U.S. Cl.
CPC ......... *F16H 57/0421* (2013.01); *B64D 41/00* (2013.01); *F16H 3/34* (2013.01); *H02K 7/10* (2013.01)

(58) Field of Classification Search
CPC ........ F16H 57/0421; H02K 7/10; B64D 41/00
(Continued)

(56) References Cited

U.S. PATENT DOCUMENTS 10,822,106 B2* 11/2020 Tanaka ................. F16H 15/38
2014/0026589 A1* 1/2014 Goi .......................... F02C 7/36
60/784
(Continued)

FOREIGN PATENT DOCUMENTS

JP 2009-275745 A 11/2009
JP 2013-019545 A 1/2013
(Continued)

*Primary Examiner* — Ha Dinh Ho
(74) *Attorney, Agent, or Firm* — Sughrue Mion, PLLC (57) ABSTRACT

Provided is a toroidal continuously variable transmission that can achieve suitable oil feed both for lubrication at contact interfaces between a power roller and discs and for cooling of the power roller; and a drive mechanism-integrated electricity generation apparatus for an aircraft, the electricity generation apparatus including the toroidal continuously variable transmission. The toroidal continuously variable transmission includes at least one lubrication outlet that discharges an oil toward at least one contact interface between an input or output disc and the power roller; and at least one cooling outlet that discharges the oil toward the power roller. The cooling outlet and the lubrication outlet are arranged such that a distance between the cooling outlet and a point at which the oil discharged from the cooling outlet contacts the power roller is smaller than a distance between the lubrication outlet and the contact interface.

8 Claims, 6 Drawing Sheets (51) Int. Cl.
*F16H 3/34* (2006.01)
*H02K 7/10* (2006.01)

(58) Field of Classification Search
USPC .......................................................... 74/325
See application file for complete search history.

(56) References Cited

U.S. PATENT DOCUMENTS

2016/0097328 A1* 4/2016 Wintgens .................. F02C 7/32
                                                                                                   415/123
2018/0062480 A1* 3/2018 Tanaka ................ F16H 57/0436
2018/0347685 A1 12/2018 Huston et al.

FOREIGN PATENT DOCUMENTS

| JP | 2016-008703 A | 1/2016 |
| JP | 2016-166642 A | 9/2016 |
| WO | 2017/096480 A1 | 6/2017 |

* cited by examiner

TOROIDAL CONTINUOUSLY VARIABLE TRANSMISSION AND DRIVE MECHANISM-INTEGRATED ELECTRICITY GENERATION APPARATUS FOR AIRCRAFT

CROSS REFERENCE TO RELATED APPLICATIONS

This application is a National Stage of International Application No. PCT/JP2020/025016 filed Jun. 25, 2020, which designates the United States, incorporated herein by reference, and which claims the benefit of priority from Japanese Patent Application No. 2019-134698 filed Jul. 22, 2019, the entire contents of which are incorporated herein by reference.

TECHNICAL FIELD

The present invention relates to a toroidal continuously variable transmission and a drive mechanism-integrated electricity generation apparatus for an aircraft.

BACKGROUND ART

A toroidal continuously variable transmission is conventionally known in which a power roller is held between input and output discs and in which the tilt angle of the power roller is changed to continuously vary the rotational speed ratio between the input and output discs. In the toroidal continuously variable transmission, the input and output discs rotate while being pressed against the power roller. Thus, a lubricating oil is fed to the regions where the power roller is in contact with the input and output discs (see Patent Literature 1, for example).

CITATION LIST

Patent Literature

PTL 1: Japanese Laid-Open Patent Application Publication No. 2016-166642

SUMMARY OF INVENTION

Technical Problem

In the toroidal continuously variable transmission disclosed in Patent Literature 1, an oil is fed toward the contact interfaces between the power roller and the discs for the purposes of lubrication at the contact interfaces and cooling of these components. In the toroidal continuously variable transmission, the suitable manner of oil feed differs between the oil fed for lubrication and the oil fed for cooling. For lubrication, the lubricating oil is preferably fed toward the contact interfaces between the power roller and the discs. For cooling, it is preferable to feed the oil quickly and directly from the feed outlet to the cooling target. In case that the oil discharged from the feed outlet moves in the air for a long period of time, the oil could be scattered due to, for example, the influence of a wind generated by rotation of the power roller before the oil reaches the cooling target. This could lead to a decrease in the amount of the oil reaching the cooling target, resulting in a failure to efficiently cool the cooling target.

In view of the above circumstances, the present invention aims to provide: a toroidal continuously variable transmission that can achieve suitable oil feed both for lubrication at contact interfaces between a power roller and discs and for cooling of the power roller, and a drive mechanism-integrated electricity generation apparatus for an aircraft, the electricity generation apparatus including the toroidal continuously variable transmission.

Solution to Problem

A toroidal continuously variable transmission according to the present invention includes: input and output discs opposed to each other; a power roller tiltably held between the input and output discs to transmit rotational drive power of the input disc to the output disc at a speed ratio determined by a tilt angle of the power roller; at least one lubrication outlet that discharges an oil toward at least one contact interface between the input or output disc and the power roller; and at least one cooling outlet that discharges the oil toward the power roller, wherein the cooling outlet and the lubrication outlet are arranged such that a distance between the cooling outlet and a point at which the oil discharged from the cooling outlet contacts the power roller is smaller than a distance between the lubrication outlet and the contact interface.

In the toroidal continuously variable transmission configured as above, the cooling outlet and the lubrication outlet are arranged such that the distance between the cooling outlet and a point at which the oil discharged from the cooling outlet contacts the power roller is smaller than the distance between the lubrication outlet and the contact interface. Thus, the distance that the oil discharged from the cooling outlet moves in the air to reach the circumferential surface of the power roller which is to be cooled is smaller than the distance that the oil discharged from the lubrication outlet moves in the air to reach the contact interface, and the oil discharged from the cooling outlet reaches the circumferential surface of the power roller quickly. As such, the power roller can be reliably cooled by the oil discharged from the cooling outlet. Additionally, since the oil is fed from the lubrication outlet toward the contact interface, lubrication at the contact interface can be reliably achieved.

A distance between the cooling outlet and the power roller may be greater than 0.7 times a diameter or a hydraulic diameter of the cooling outlet.

Since the distance between the cooling outlet and the power roller is greater than 0.7 times the diameter or hydraulic diameter of the opening of the cooling outlet, the efficiency of cooling of the power roller is prevented from being reduced due to extreme proximity of the cooling outlet to the circumferential surface of the power roller which is to be cooled, and the cooling can be reliably achieved.

The toroidal continuously variable transmission may further include a holder rotatably holding the power roller, and the lubrication outlet and the cooling outlet may be included in the holder.

Since the lubrication outlet and the cooling outlet are included in the holder rotatably holding the power roller, the element including the lubrication outlet and the cooling outlet can be used also as an element for holding the power roller. Thus, the configuration of the toroidal continuously variable transmission can be simplified.

The holder may include a trunnion tiltably holding the power roller and a beam mounted on the trunnion, the trunnion may include a base on which the power roller is rotatably mounted and a pair of side walls rising from the base, the side walls being opposed across the power roller in an axial direction of a tilt shaft of the power roller and facing a circumferential surface of the power roller, the beam may be located across the power roller from the base, extend in the axial direction of the tilt shaft, and be mounted on the pair of side walls, and the lubrication outlet and the cooling outlet may be included in the beam.

Since the lubrication outlet and the cooling outlet are included in the beam, the configuration of the element including the lubrication outlet and the cooling outlet can be simplified in the toroidal continuously variable transmission.

The at least one contact interface may include a first contact interface between the input disc and the power roller and a second contact interface between the output disc and the power roller, the at least one lubrication outlet may include a first lubrication outlet that feeds the oil toward the first contact interface and a second lubrication outlet that feeds the oil toward the second contact interface, the at least one cooling outlet may include a first cooling outlet and a second cooling outlet, the first lubrication outlet and the first cooling outlet may be located closer to one end of the beam than a rotational axis of the power roller, and the second lubrication outlet and the second cooling outlet may be located closer to the other end of the beam than the rotational axis of the power roller.

Since the first lubrication outlet and the first cooling outlet are located toward one end of the beam in the axial direction of the tilt shaft and the second lubrication outlet and the second cooling outlet are located toward the other end of the beam in the axial direction of the tilt shaft, oil feed suitable for lubrication at the contact interfaces and oil feed suitable for cooling of the power roller can be performed from the opposite points on the beam in the axial direction of the tilt shaft. Additionally, since the first lubrication outlet, second lubrication outlet, first cooling outlet, and second cooling outlet are included in one and the same beam, the configuration for delivering the oil to the outlets can be simplified.

The cooling outlet may be located upstream of the lubrication outlet in a rotational direction of the power roller.

Since the cooling outlet is located upstream of the lubrication outlet, the cooling outlet can discharge the oil toward a point immediately downstream of the region where the input or output disc and the power roller are in contact. The temperature of the power roller is high particularly at such a point immediately downstream of the contact region. Thus, discharging the oil toward such a point means feeding the oil directly to the high-temperature region of the power roller. This prevents reduction in the efficiency of cooling of the power roller.

An opening area of the cooling outlet may be larger than an opening area of the lubrication outlet.

Since the opening area of the cooling outlet is larger than the opening area of the lubrication outlet, the amount of the oil discharged from the cooling outlet can be made greater than the amount of the oil discharged from the lubrication outlet. In the case where cooling of the power roller requires a larger amount of oil than lubrication at the contact interface between the power roller and the disc, the amount of the oil discharged from the cooling outlet can be increased relative to the amount of the oil discharged from the lubrication outlet to make the amount of the fed oil suitable for each of the lubrication at the contact interface between the disc and the power roller and the cooling of the power roller.

A drive mechanism-integrated electricity generation apparatus for an aircraft according to the present invention includes: the toroidal continuously variable transmission as defined above; an input mechanism that inputs rotational drive power from a rotational shaft of an engine of the aircraft to the toroidal continuously variable transmission; and an electricity generator driven by output of the toroidal continuously variable transmission.

The drive mechanism-integrated electricity generation apparatus configured as above is constructed using the toroidal continuously variable transmission that can achieve suitable oil feed both for lubrication at the contact interface and for cooling of the power roller. Thus, in the drive mechanism-integrated electricity generation apparatus, both lubrication at the contact interface and cooling of the power roller can be reliably achieved.

Advantageous Effects of Invention

In the present invention, suitable oil feed can be achieved both for lubrication at contact interfaces between a power roller and discs and for cooling of the power roller.

DESCRIPTION OF EMBODIMENTS

Hereinafter, exemplary embodiments of the present invention will be described with reference to the drawings.

[Aircraft Electricity Generation Apparatus]

Figure 1:
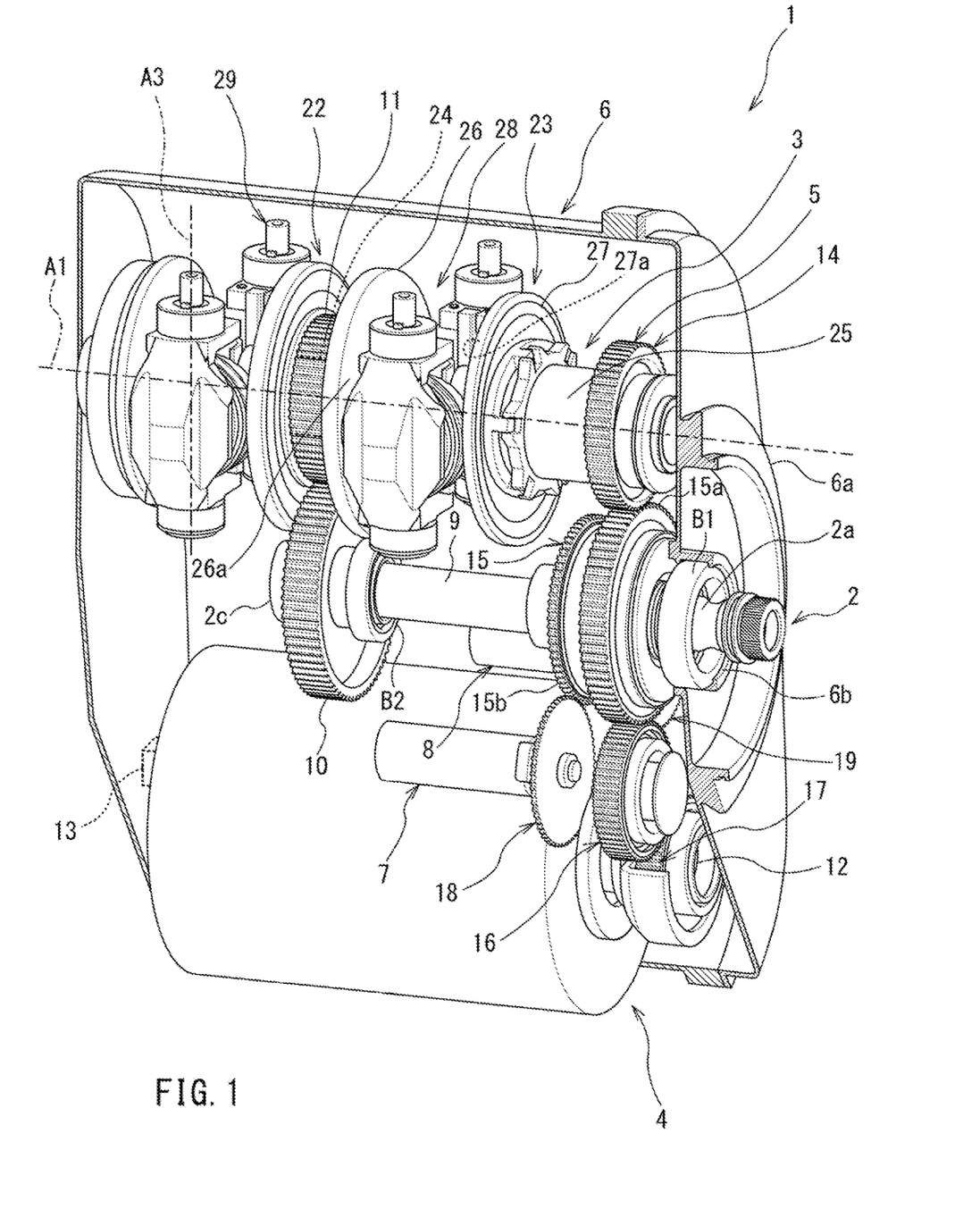
FIG. 1 is a cross-sectional perspective view showing the configuration of an aircraft electricity generation apparatus including a transmission according to an exemplary embodiment of the present invention.

FIG. 1 is a cross-sectional perspective view showing the configuration of an aircraft electricity generation apparatus (drive mechanism-integrated electricity generation apparatus for an aircraft) 1 according to an exemplary embodiment. This electricity generation apparatus may be hereinafter referred to as "electricity generation apparatus 1". The electricity generation apparatus 1 is a drive mechanism-integrated electricity generation apparatus. The electricity generation apparatus 1 includes: an input mechanism 2 that inputs rotational drive power from a rotational shaft of an engine of an aircraft to a transmission (toroidal continuously variable transmission) 3; the transmission 3 disposed in parallel to the input mechanism 2; an electricity generator 4 disposed in parallel to the input mechanism 2 and transmission 3 and driven by output of the transmission 3; a power transfer mechanism 5 located toward a first axial end 2a of the input mechanism 2 to transmit the output of the transmission 3 to the electricity generator 4; a casing 6 including a mounting portion 6a located toward the first axial end 2a of the input mechanism 2; and accessory devices including oil pumps 7 and 8 driven by the output of the transmission 3.

The input mechanism 2 transmits the rotational drive power of the engine to the transmission 3. The input mechanism 2 includes a shaft main body 9 and a transfer gear 10 located toward a second axial end 2c that is in proximity to the transmission input gear 11, the transfer gear 10 being close to one end of the shaft main body 9. The transfer gear 10 is in mesh with the transmission input gear 11. The input mechanism 2 is rotatably supported by a bearing B1 located around the circumference of an opening 6b of the casing 6 and a bearing B2 located inside the casing 6.

The electricity generator 4 includes an electricity generator input shaft 12 located toward the first axial end 2a of the input mechanism 2 which is in proximity to the opening 6b of the casing 6. The electricity generator input shaft 12 serves to input drive power to the electricity generator 4. Once the output of the transmission 3 is input to the electricity generator input shaft 12 through the power transfer mechanism 5, the electricity generator 4 generates electricity therein, and the generated electricity is drawn through a terminal 13 projecting out of the casing 6. In the electricity generation apparatus 1, the speed ratio of the transmission 3 is adjusted so that the output of the transmission 3 is input to the electricity generator input shaft 12 through the power transfer mechanism 5 in the form of rotational drive power that produces rotation at a given speed. Thus, AC power with a given frequency is generated by the electricity generator 4 and supplied to an external device through the terminal 13.

The power transfer mechanism 5 transmits the output of the transmission 3 to the electricity generator 4 and other devices such as the oil pumps 7 and 8. For example, the power transfer mechanism 5 includes: a first gear 14 mounted on a transmission output shaft 25 of the transmission 3 to receive the output of the transmission 3; a second gear 15 meshing with the first gear 14; a third gear 16 meshing with a main gear portion 15a of the second gear 15; a fourth gear 17 meshing with the third gear 16 to input power to the electricity generator input shaft 12 of the electricity generator 4; a fifth gear 18 meshing with a sub-gear portion 15b of the second gear 15 to transmit power to the oil pump 7; and a sixth gear 19 meshing with the sub-gear portion 15b to transmit power to the oil pump 8. The power transmitted to the fifth gear 18 is used as drive power for the oil pump 7. The power transmitted to the sixth gear 19 is used as drive power for the oil pump 8. The second gear 15 is mounted around the shaft main body 9 of the input mechanism 2 and rotatable relative to the shaft main body 9 independently of the rotation of the shaft main body 9.

The casing 6 is shaped as a thin, elongated, flattened box. The mounting portion 6a is an annular flange located at one side surface of the casing 6. The electricity generation apparatus 1 is mounted to the engine by winding a mounting tool such as a clamping band around the mounting portion 6a. In the region surrounded by the mounting portion 6a there is the opening 6b communicating with the interior of the casing 6. The first axial end 2a of the input mechanism 2 projects out of the opening 6b.

The oil pump 7 is an oil feed pump that feeds a lubricating oil to components such as the transmission 3 and power transfer mechanism 5. The oil pump 8 is an oil suction pump that sucks in the oil retained in the casing 6.

[Transmission]

The transmission 3 is a continuously variable transmission of the traction drive type and may be, for example, a half-toroidal continuously variable transmission of the double cavity type. The transmission 3 includes: an input structure 22 located toward the second axial end 2c of the input mechanism 2 to receive output from the input mechanism 2; and an output structure 23 located toward the first axial end 2a of the input mechanism 2 to transmit output resulting from a speed change process to the power transfer mechanism 5. Specifically, the transmission 3 includes: a hollow transmission input shaft 24 rotatably supported by a bearing (not shown) inside the casing 6; and a transmission output shaft 25 inserted into the hollow interior of the transmission input shaft 24 and having an axially central portion enclosed by the transmission input shaft 24, the transmission output shaft 25 being rotatable independently of the transmission input shaft 24. In the present embodiment, the rotational centers of the transmission input and output shafts 24 and 25 coincide with the axial centerline of the transmission. In the present embodiment, the axial centerline of the transmission will hereinafter be referred to as "transmission axis A1".

The transmission 3 includes: the transmission input gear 11 which functions as an element of the input structure 22; a pair of input discs 26 mounted respectively on opposite surfaces of the transmission input gear 11; and a pair of output discs 27 mounted on the transmission output shaft 25, each output disc 27 being opposed to a corresponding one of the input discs 26. The transmission input gear 11 and the pair of input discs 26 are rotatable about the transmission axis A1 together with the transmission input shaft 24. The pair of output discs 27 are rotatable about the transmission axis A1 together with the transmission output shaft 25. An annular cavity 28 is located between the input and output discs 26 and 27 opposed to each other. The two cavities 28 extend around the transmission axis A1 and are aligned in the direction of the transmission axis A1. In the transmission 3, one of the output discs 27 that is closer to the mounting portion 6a than the other output disc 27 functions as an element of the output structure 23.

Figure 2:
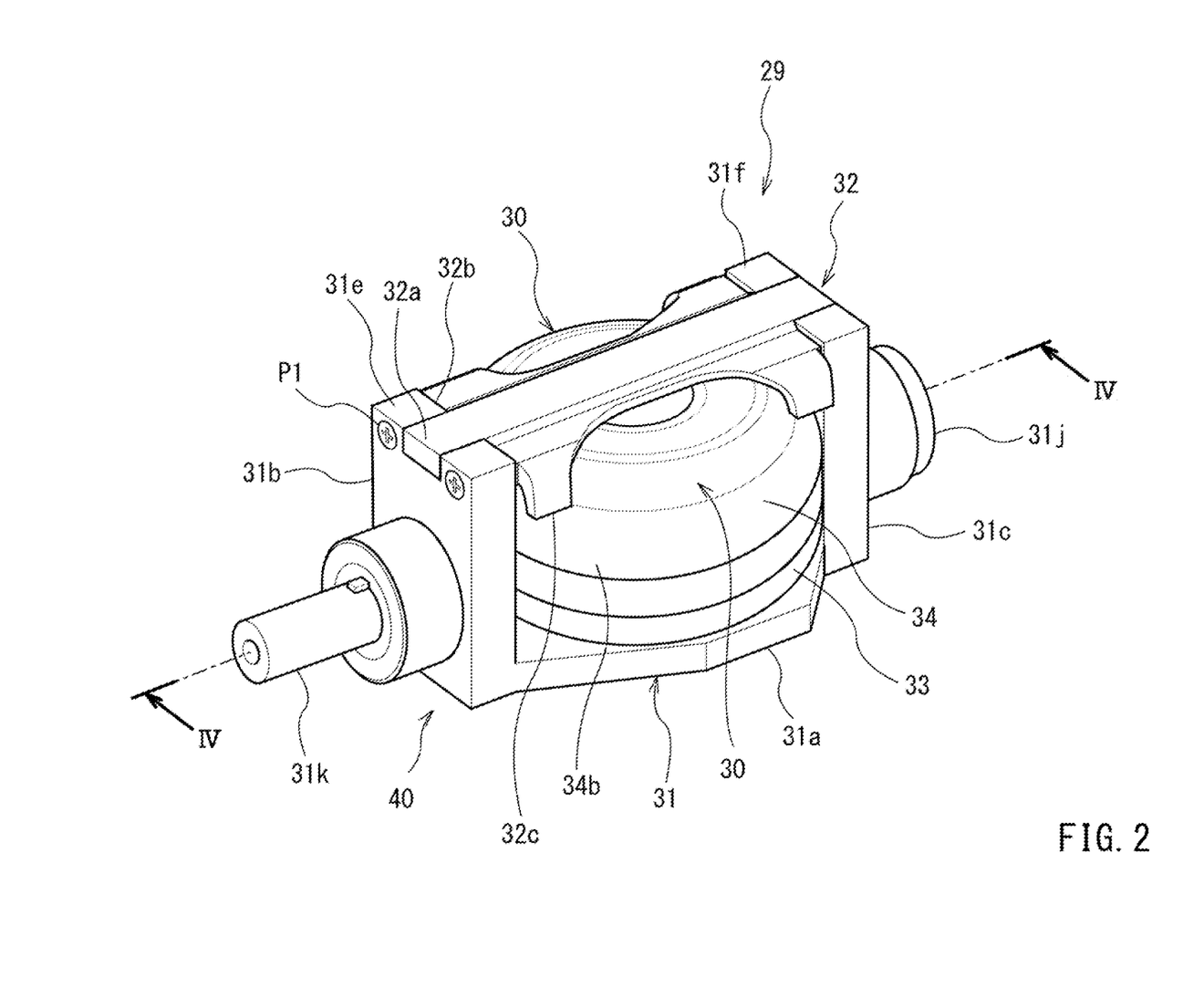
FIG. 2 is a perspective view of a speed change unit of the transmission included in the electricity generation apparatus of FIG. 1.
Figure 3:
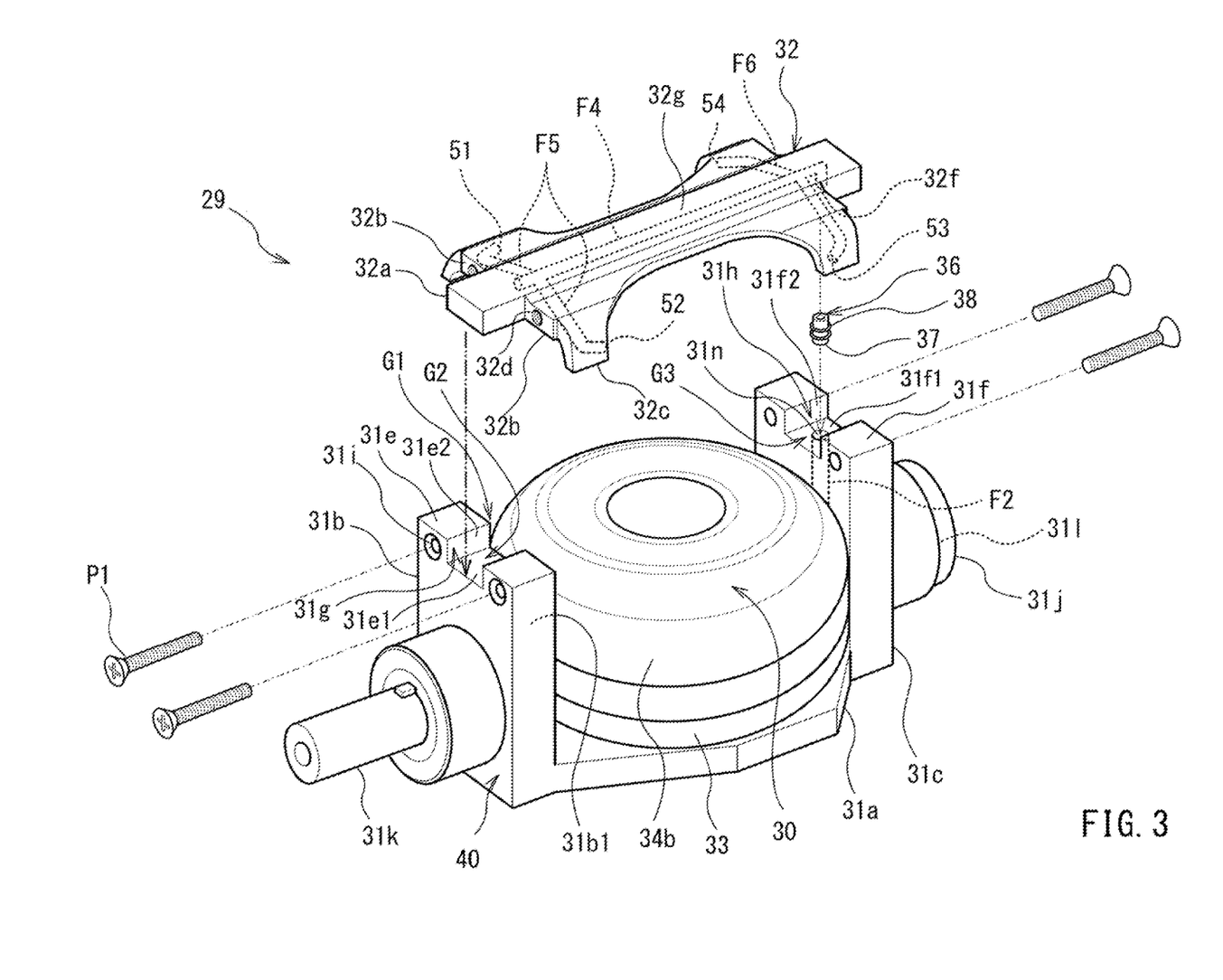
FIG. 3 is a partially exploded perspective view of the speed change unit of FIG. 2.
Figure 4:
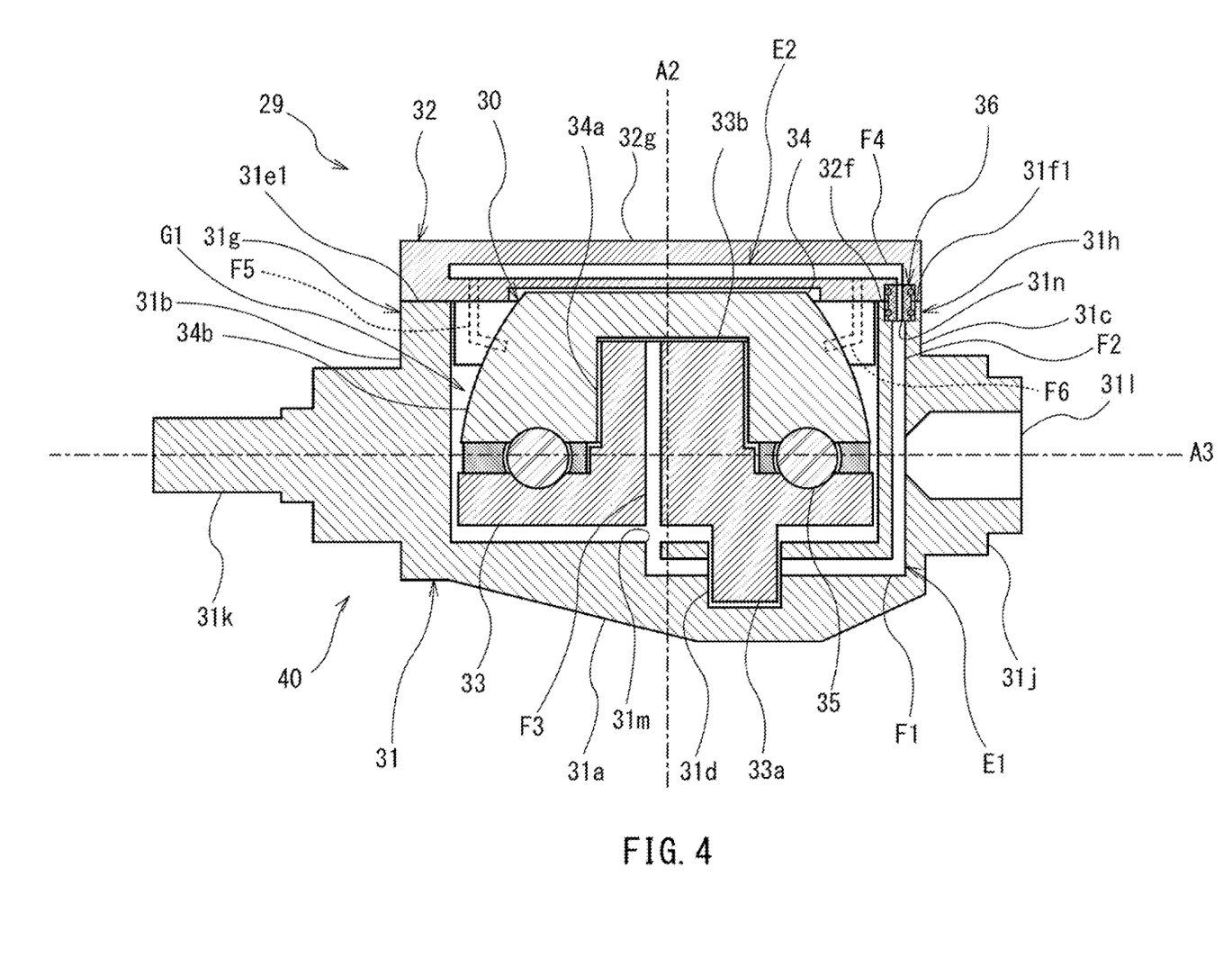
FIG. 4 is a cross-sectional view taken along the line IV-IV of FIG. 2.

The transmission 3 includes speed change units 29 disposed in the cavities 28. FIG. 2 is a perspective view showing the configuration of the speed change unit 29. FIG. 3 is a partially exploded perspective view of the speed change unit 29. FIG. 4 is a cross-sectional view of the speed change unit 29 taken along the line TV-IV of FIG. 2. As shown in FIGS. 2 and 3, the speed change unit 29 is an assembly constructed of a power roller unit 30, a trunnion 31, and a beam 32. In the transmission 3, as shown in FIG. 1, two of the speed change units 29 are arranged in parallel in each of the pair of cavities 28 aligned in the direction of the transmission axis A1.

The power roller unit 30 is supported by the trunnion 31. As shown in FIG. 4, the power roller unit 30 includes: a support 33 mounted on the trunnion 31; a substantially hemispherical power roller 34 rotatably supported by the support 33; and a bearing 35 located between the support 33 and power roller 34 to rotatably support the power roller 34.

The speed change unit 29 includes a holder 40 that rotatably supports the power roller 34. For example, the holder 40 includes the trunnion 31, the beam 32, the support 33, and the bearing 35. That is, in the present embodiment, the holder 40 is constructed of all the elements of the speed change unit 29 except for the power roller 34.

The support 33 is a substantially disc-shaped plate and includes an eccentric shaft 33a projecting toward the trunnion 31. The support 33 is supported at the eccentric shaft 33a by the trunnion 31. The support 33 further includes a roller rotational shaft 33b projecting along a rotational axis A2 in a direction opposite to that in which the eccentric shaft 33a projects.

The power roller 34 includes a recessed, rotatably supported portion 34a that faces the roller rotational shall 33b. The roller rotational shaft 33b is inserted into the rotatably supported portion 34a to rotatably support the power roller 34 so that the power roller 34 is rotatable about the axis of the roller rotational shaft 33b. Thus, the power roller 34 is rotatably supported about the rotational axis A2. The circumferential surface 34b of the power roller 34 is a gently curved surface. During operation, the lubricating oil forms an oil film on the circumferential surface 34b of the power roller 34. The transmission 3 includes a pressing mechanism (not shown) located in the vicinity of either of the output discs 27 to hold the circumferential surface 34b of each power roller 34 between the input and output discs 26 and 27 with a given pressing force. While being pressed by the pressing mechanism, the power roller 34 is tiltably held between a roller-facing surface 26a of the input disc 26 and a roller-facing surface 27a of the output disc 27, with the oil film interposed between the power roller 34 and the roller-facing surfaces 26a and 27a. The transmission 3 uses the viscous resistance of the oil film (fluid friction) to transmit the rotational drive power of the input disc 26 to the output disc 27 through the power roller 34.

The trunnion 31 supports the power roller unit 30 while covering a part of the circumferential surface 34b. In the transmission 3, the trunnion 31 is pivotable (tiltable) about a tilt axis A3. The trunnion 31 tilts together with the power roller 34. The tilt axis A3 is skew to the transmission axis A1 and perpendicular to the rotational axis A2 (FIG. 1). As shown in FIGS. 3 and 4, the trunnion 31 includes: a base 31a which extends in the direction of the tilt axis A3 and on which the power roller unit 30 is mounted; and a pair of side walls 31b and 31c rising from the base 31a, the side walls 31b and 31c being opposed across the power roller unit 30 in the direction of the tilt axis A3 (the axial direction of tilt shafts) and facing the circumferential surface 34b of the power roller 34.

The base 31a includes a rotatably supporting portion 31d located in one surface of the base 31a to rotatably support the eccentric shaft 33a. The pair of side walls 31b and 31c project respectively from both longitudinal ends of the base 31a, and a space G1 accommodating the power roller 34 is defined between the pair of side walls 31b and 31c. The thickness direction of the pair of side walls 31b and 31c coincides with the direction of the tilt axis A3. The pair of side walls 31b and 31c include end surfaces 31e and 31f, respectively, the end surfaces 31e and 31f being located at distal ends of the side walls 31b and 31c in the direction in which the side walls 31b and 31c rise.

The end surfaces 31e and 31f include grooves 31g and 31h, respectively, the grooves 31g and 31h being located at the centers of the end surfaces 31e and 31f. The grooves 31g and 31h are formed by recessing the central regions of the end surfaces 31e and 31f. As shown in FIG. 3, the grooves 31g and 31h are open at both ends in the direction of the tilt axis A3. In each of the grooves 31g and 31h, a reception space G2 or G3 is defined by a bottom surface 31e1 or 31f1 and a pair of side surfaces 31e2 or 31f2 facing each other across the bottom surface 31e1 or 31f1. Each of the side walls 31b and 31c includes insertion holes 31i extending through the entire thickness of the side wall 31b or 31c in the direction of the tilt axis A3.

Tilt shafts (short shaft 31j and long shaft 31k) extending in the direction of the tilt axis A3 are located outside the pair of side walls 31b and 31c when viewed from the power roller unit 30. An actuator (not shown) is coupled to either the short shaft 31j or long shaft 31k. In the transmission 3, each of the speed change units 29 is supported at its short and long shafts 31j and 31k so as to be tiltable about the tilt axis A3. Thus, the power roller 34 is rotatable about the tilt axis A3. The tilt angle of the speed change unit 29 (the angle of rotation relative to a reference position about the tilt axis A3) can be adjusted by moving the power roller 34 relative to the input and output discs 26 and 27 in the direction of the tilt axis A3 with the use of the actuator. The power roller 34 transmits the rotational drive power of the input disc 26 to the output disc 27 at a speed ratio determined by the tilt angle.

The beam 32 is located across the power roller 34 from the base 31a of the trunnion 31, and extends in the direction of the tilt axis A3 (the axial direction of the tilt shafts). The beam 32 is mounted on the pair of side walls 31b and 31c to reinforce the trunnion 31. The beam 32 is in an elongated shape extending in the direction of the tilt axis A3. The beam 32 includes: an elongated body portion 32g extending between the pair of side walls 31b and 31c; a pair of contact portions 32a located near to both longitudinal ends of the body portion 32g, respectively; a pair of lock portions 32b located nearer to the longitudinal center of the body portion 32g than the pair of contact portions 32a; and four extension portions 32c extending from the pair of lock portions 32b in the transverse direction (width direction) of the beam 32.

The pair of contact portions 32a are fitted into the grooves 31g and 31h, respectively, and thus the beam 32 is mounted on the pair of side walls 31b and 31c. As a result, the beam 32 is blocked from moving toward the base 31a of the trunnion 31. Additionally, the beam 32 is prevented from moving in the transverse direction, i.e., a direction perpendicular to both the direction of the tilt axis A3 and the direction in which the side walls 31b and 31c rise.

As shown in FIG. 3, the pair of lock portions 32b are located close to both longitudinal ends of the beam 32, respectively, and each of the lock portions 32b projects outward from both edges of the body portion 32g in the transverse direction. Thus, each lock portion 32b includes two parts opposed across the body portion 32g in the transverse direction. The lock portions 32b are inside the space G1 and in contact with those inner surfaces of the pair of side walls 31b and 31c which face each other (see FIG. 3). Thus, for example, in the event that during operation of the electricity generation apparatus 1, an external pressing force applied by the pressing mechanism and transmitted to the roller rotational shaft 33b of the power roller unit 30 is exerted also on the trunnion 31, the pair of side walls 31b and 31c are prevented from being deformed toward each other.

As shown in FIG. 3, the side surface of each lock portion 32b includes insertion holes 32d that are aligned with the insertion holes 31i when the beam 32 is combined with the trunnion 31. The beam 32 is threadedly secured to the trunnion 31 at several points by fasteners P1 such as screws laterally inserted into the insertion holes 31i and 32d from outside the pair of side walls 31b and 31c. Thus, the beam 32 is coupled to the pair of side walls 31b and 31c. The structure for mounting the beam 32 on the trunnion 31 is not limited to that as described above, and any of various structures may be used to mount the beam 32 on the trunnion 3.

Two of the extension portions 32c are located close to one longitudinal end of the beam 32 and at a given distance from the inner surface of the side wall 31b, and the other two of the extension portions 32c are located close to the other longitudinal end of the beam 32 and at a given distance from the inner surface of the side wall 31c. The extension portions 32c extend toward the upper surface of the base 31a and the circumferential surface 34b of the power roller 34.

As shown in FIGS. 3 and 4, the speed change unit 29 includes oil passages F1 to F6 located inside the power roller unit 30, trunnion 31, and beam 32 to allow an oil to flow inside the power roller unit 30, trunnion 31, and beam 32 for the purposes of forming an oil film on the circumferential surface 34b of the power roller 34 and cooling the power roller 34. The oil passages F1 to F3 are parts of a first oil passage E1 located inside the trunnion 31. The oil passages F4 to F6 are parts of a second oil passage E2 located inside the beam 32 and connected to the first oil passage E1.

Specifically, the trunnion 31 includes: the oil passage F1 originating from a first opening 311 located at the end surface of the short shall 31j, passing inside the base 31a, and leading to the rotatably supporting portion 31d and a second opening 31m located at the upper surface of the base 31a; and the oil passage F2 branching from the oil passage F1, passing inside the side wall 31c, and leading to a third opening 31n located at the surface of the groove 31h in the end surface 31f of the side wall 31c.

The power roller unit 30 includes the oil passage F3 extending through the entire thickness of the support 33. The oil is fed to components such as the bearing 35 of the power roller unit 30 through the oil passage F3.

The beam 32 includes a fourth opening 32f located at the surface of the contact portion 32a which is in contact with the end surface 31f at which the third opening portion 31n is located. The beam 32 further includes: the oil passage F4 extending from the fourth opening 32f along the thickness of the beam 32 in a direction away from the trunnion 31 and bent at a given point to extend along the length of the beam 32; the oil passage F5 branching from the oil passage 4 toward the opposite ends of the width of the beam 32 at a point located toward one longitudinal end of the beam 32, the oil passage F5 extending inside two of the extension portions 32c in directions in which the two extension portions 32c extend, the two extension portions 32c being those located toward the one longitudinal end; and the oil passage F6 branching from the oil passage 4 toward the opposite ends of the width of the beam 32 at a point located toward the other longitudinal end of the beam 32, the oil passage F6 extending inside other two of the extension portions 32c in directions in which the other two extension portions 32c extend, the other two extension portions 32c being those located toward the other longitudinal end.

Figure 5:
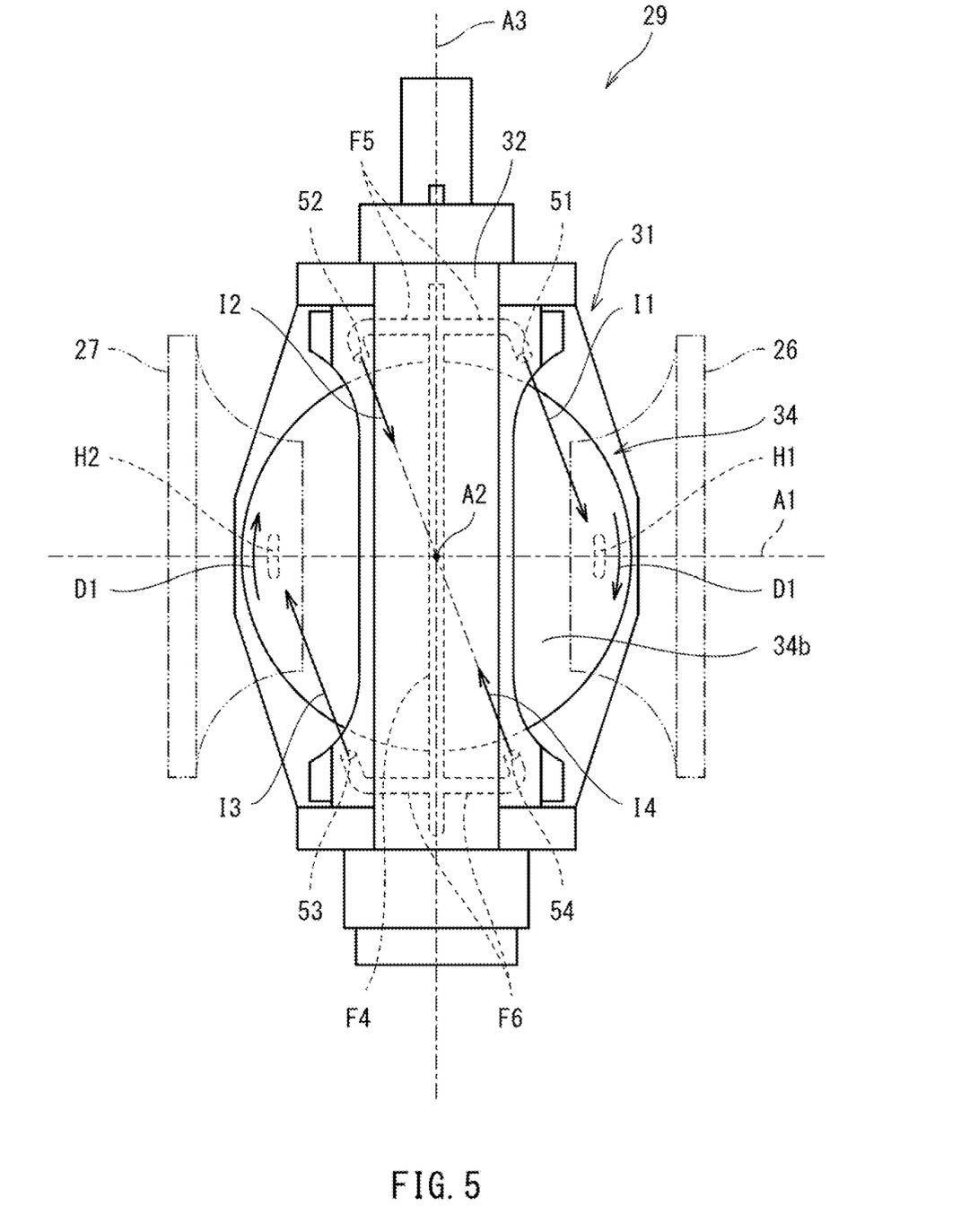
FIG. 5 is a schematic plan view of the speed change unit of FIG. 2 as viewed along the rotational axis of a power roller.

FIG. 5 is a schematic plan view of the speed change unit 29 as viewed along the rotational axis A2 of the power roller 34. As shown in FIG. 5, the oil passage F5 branches from the oil passage F4 in opposite directions and includes a pair of downstream ends. The pair of downstream ends of the oil passage F5 are located toward the one longitudinal end of the beam 32 (on one side of the speed change unit 29 as viewed along the rotational axis A2 of the power roller 34). A first lubrication outlet 51 is located at one of the pair of downstream ends, and a first cooling outlet 52 is located at the other downstream end. The first lubrication outlet 51 discharges the oil toward a first contact interface H1 between the input disc 26 and power roller 34. The first cooling outlet 52 discharges the oil toward the power roller 34. For example, the first lubrication outlet 51 and first cooling outlet 52 have a circular shape.

Likewise, the oil passage F6 branches from the oil passage F4 in opposite directions and includes a pair of downstream ends. The pair of downstream ends of the oil passage F6 are located toward the other longitudinal end of the beam 32 (on the other side of the speed change unit 29 as viewed along the rotational axis A2 of the power roller 34). A second lubrication outlet 53 is located at one of the pair of downstream ends, and a second cooling outlet 54 is located at the other downstream end. The second lubrication outlet 53 discharges the oil toward a second contact interface H2 between the output disc 27 and power roller 34. The second cooling outlet 54 discharges the oil the toward the power roller 34. For example, the second lubrication outlet 53 and second cooling outlet 54 have a circular shape. The positional relationship of the input and output discs 26 and 27 with the outlets 51 to 54 may be reversed.

The first lubrication outlet 51 and first cooling outlet 52 are located toward the one longitudinal end of the beam 32 and at the opposite ends of the width of the beam 32. The first lubrication outlet 51 and first cooling outlet 52 are opposed across the oil passage F4 located at the center of the width of the beam 32. The first lubrication outlet 51 and first cooling outlet 52 are located at the ends of the oil passage F5 extending inside the extension portions 32c along the width of the beam 32.

The second lubrication outlet 53 and second cooling outlet 54 are located toward the other longitudinal end of the beam 32 and at the opposite ends of the width of the beam 32. The second lubrication outlet 53 and second cooling outlet 54 are opposed across the oil passage F4 located at the center of the width of the beam 32. The first lubrication outlet 51 and first cooling outlet 52 are located at the ends of the oil passage F6 extending inside the extension portions 32c along the width of the beam 32.

The first and second lubrication outlets 51 and 53 are point-symmetric with respect to the rotational axis A2 of the power roller 34. Likewise, the first and second cooling outlets 52 and 54 are point-symmetric with respect to the rotational axis A2 of the power roller 34. The point where the oil discharged from the first cooling outlet 52 collides with the power roller 34 and the point where the oil discharged from the second cooling outlet 54 collides with the power roller 34 may be different in the direction of the rotational axis A2.

While the rotational shaft of the engine of the aircraft is driven and rotational drive power is transmitted from the engine to the electricity generator 4 though the transmission 3, the oil pump 7 is operated to allow the oil to flow through the oil passages F1 to F6 of the speed change unit 29 and be discharged from each of the first lubrication outlet 51, first cooling outlet 52, second lubrication outlet 53, and second cooling outlet 54 for the purposes of lubrication between the power roller 34 and the input and output discs 26 and 27 and cooling of the power roller 34.

Figure 6:
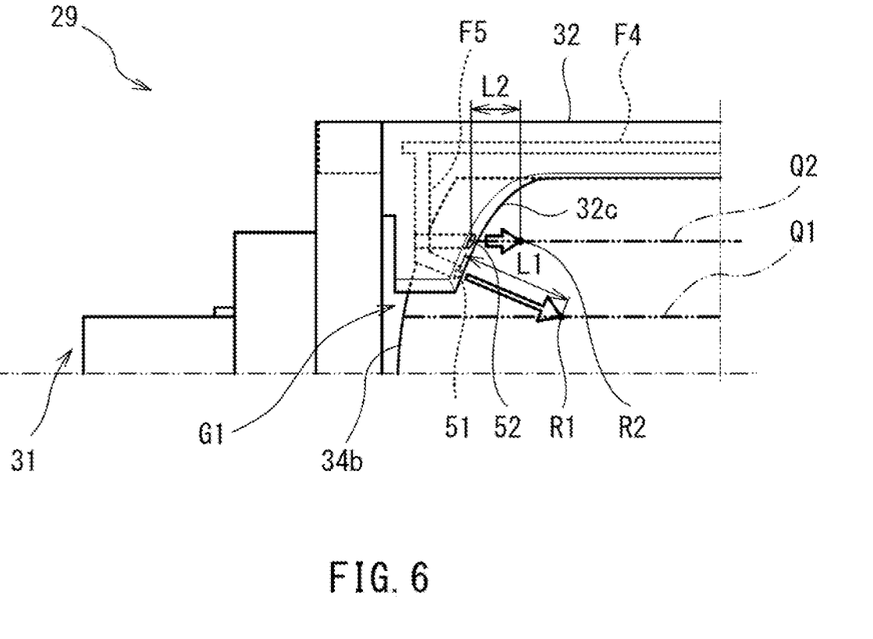
FIG. 6 is an enlarged side view of the vicinity of outlets included in a beam of the speed change unit of FIG. 2.

FIG. 6 is an enlarged side view of the vicinity of the first lubrication outlet 51 and first cooling outlet 52 located toward the one longitudinal end of the beam 32. The second lubrication outlet 53 and second cooling outlet 54 located toward the other longitudinal end of the beam 32 are identical to the first lubrication outlet 51 and first cooling outlet 52. Thus, the following description focuses on the first lubrication outlet 51 and first cooling outlet 52. As shown in FIG. 6, each of the first lubrication outlet 51 and first cooling outlet 52 is located at a side surface (power roller 34-facing surface) of the corresponding one of the extension portions 32c, the side surface being in the vicinity of the distal end of the extension portion 32c in the width direction of the beam 32.

At one end of the width of the beam 32, as shown in FIG. 6, the first lubrication outlet 51 discharges the oil to the circumferential surface 34b of the power roller 34. Specifically, the oil is discharged toward a point R1 on a contact region Q1 (one of the dashed-two dotted lines in FIG. 6) of the circumferential surface 34b of the power roller 34 which is in contact with the roller-facing surface 26a of the input disc 26, and the discharged oil collides with the power roller 34 at the point R1. The contact region Q1 corresponds to the locus of the first contact interface H1 (FIG. 5) on the rotating power roller 34.

At the other end of the width of the beam 32, as shown in FIG. 6, the first cooling outlet 52 is disposed to discharge the oil to the circumferential surface 34b of the power roller 34. The oil discharged from the first cooling outlet 52 collides with the power roller 34 at a point R2 on the circumferential surface 34b of the power roller 34. The point R2 is relatively close to the first cooling outlet 52. The region where the oil discharged from the first cooling outlet 52 collides with the circumferential surface 34b of the power roller 34 is indicated as a collision region Q2 (the other of the dashed-two dotted lines in FIG. 6). The collision region Q2 corresponds to the locus of the point R2 (the point at which the oil discharged from the first cooling outlet 52 collides with the circumferential surface 34b) on the rotating power roller 34.

Conventionally, different outlets discharge an oil toward a power roller in order to form an oil film on the circumferential surface of the power roller and achieve both lubrication between the power roller and discs and cooling of the power roller. In the present embodiment, the first lubrication outlet 51 discharges an oil toward the first contact interface H1, and the first cooling outlet 52 discharges the oil toward the rotational axis A2 of the power roller 34. The first lubrication outlet 51 and first cooling outlet 52 have different functions, and each of the first lubrication outlet 51 and first cooling outlet 52 discharges the oil in a direction appropriate for the function of the outlet.

As shown in FIG. 5, the first cooling outlet 52 is disposed such that an imaginary extension I2 of the axis of the first cooling outlet 52 is directed toward a point closer to the rotational axis A2 of the power roller 34 than a point toward which an imaginary extension I1 of the axis of the first lubrication outlet 51 is directed. In particular, the imaginary extension I2 of the axis of the first cooling outlet 52 is directed toward the rotational axis A2 itself of the power roller 34. That is, the first cooling outlet 52 discharges the oil such that the oil takes the shortest distance to reach the circumferential surface 34b of the power roller 34. The first lubrication outlet 51 discharges the oil directly toward the first contact interface H1 between the input disc 26 and the power roller 34. That is, the first lubrication outlet 51 is directed toward the first contact interface H1 between the input disc 26 and the power roller 34. As described above, the first lubrication outlet 51 discharges the oil toward the first contact interface H1, while the first cooling outlet 52 discharges the oil toward the rotational axis A2 of the power roller 34. Thus, the first lubrication outlet 51 and first cooling outlet 52 are disposed to discharge the oil in different directions.

Since the first lubrication outlet 51 and first cooling outlet 52 are arranged such that the imaginary extension I2 of the axis of the first cooling outlet 52 is directed toward a point closer to the rotational axis A2 of the power roller 34 than a point toward which the imaginary extension I1 of the axis of the first lubrication outlet 51 is directed, the distance between the first cooling outlet 52 and the point at which the oil discharged from the first cooling outlet 52 contacts the power roller 34 is smaller than the distance between the first lubrication outlet 51 and the first contact interface H1. That is, the distance that the oil discharged from the first cooling outlet 52 moves in the air to reach the circumferential surface 34b of the power roller 34 is smaller than the distance that the oil discharged from the first lubrication outlet 51 moves in the air to reach the first contact interface H1.

In the present embodiment described thus far, the imaginary extension I2 of the axis of the first cooling outlet 52 is directed toward the rotational axis A2 itself of the first cooling outlet 52, so that the oil discharged from the first cooling outlet 52 takes the shortest distance to reach the circumferential surface 34b of the power roller 34. However, the present invention is not limited to this configuration of the above embodiment. The imaginary extension I2 of the axis of the first cooling outlet 52 need not be directed toward the rotational axis A2 itself of the power roller 34, and may be directed toward a point closer to the rotational axis A2 of the power roller 34 than a point toward which the imaginary extension I1 of the axis of the first lubrication outlet 51 is directed. The imaginary extension I2 of the axis of the first cooling outlet 52 need not intersect with the rotational axis A2 of the power roller 34. The direction of the imaginary extension I2 of the axis of the first cooling outlet 52 and the direction of the imaginary extension I1 of the axis of the first lubrication outlet 51 may be in any relationship so long as the imaginary extension I2 of the axis of the first cooling outlet 52 is directed toward a point closer to the rotational axis A2 of the power roller 34 than a point toward which the imaginary extension I1 of the axis of the first lubrication outlet 51 is directed. The first lubrication outlet 51 and first cooling outlet 52 may be arranged in any manner so long as the distance between the first cooling outlet 52 and the point at which the oil discharged from the first cooling outlet 52 contacts the power roller 34 is smaller than the distance between the first lubrication outlet 51 and the first contact interface H1.

In the present embodiment, the imaginary extensions I1 and I2 as viewed in the direction of the rotational axis A2 of the power roller 34 are asymmetric with respect to the tilt axis A3. For example, the first lubrication outlet 51 and first cooling outlet 52 are arranged such that the direction in which the oil is discharged from the first lubrication outlet 51 and the direction in which the oil is discharged from the first cooling outlet 52 are substantially parallel to each other. The direction in which the oil is discharged from the first lubrication outlet 51 and the direction in which the oil is discharged from the first cooling outlet 52 may be in another positional relationship. The direction in which the oil is discharged from the first lubrication outlet 51 and the direction in which the oil is discharged from the first cooling outlet 52 may be varied according to the locations of the first lubrication outlet 51 and first cooling outlet 52 so long as the first lubrication outlet 51 discharges the oil toward the first contact interface H1 and the first cooling outlet 52 discharges the oil toward the rotational axis A2 of the power roller 34. For example, the first lubrication outlet 51 and first cooling outlet 52 may be arranged such that the oil is discharged inward in the width direction of the beam 32 from the first lubrication outlet 51 and first cooling outlet 52 or outward in the width direction of the beam 32 from the first lubrication outlet 51 and first cooling outlet 52. Alternatively, the oil may be discharged inward in the width direction of the beam 32 from one of the first lubrication outlet 51 and first cooling outlet 52 and outward in the width direction of the beam 32 from the other of the first lubrication outlet 51 and first cooling outlet 52.

Likewise, the second cooling outlet 54, which discharges the oil toward the circumferential surface 34b of the power roller 34, is disposed such that an imaginary extension I4 of the axis of the second cooling outlet 54 is directed toward a point closer to the rotational axis A2 of the power roller 34 than a point toward which an imaginary extension I3 of the axis of the second lubrication outlet 53 is directed. Specifically, the imaginary extension I4 of the axis of the second cooling outlet 54 is directed toward the rotational axis A2 itself of the power roller 34. That is, the second cooling outlet 54 discharges the oil such that the oil takes the shortest distance to reach the circumferential surface 34b of the power roller 34. The second lubrication outlet 53 discharges the oil directly toward the second contact interface H2 between the output disc 27 and the power roller 34.

The second lubrication outlet 53 and second cooling outlet 54 are also arranged such that the imaginary extension I4 of the axis of the second cooling outlet 54 is directed toward a point closer to the rotational axis A2 of the power roller 34 than a point toward which the imaginary extension I3 of the axis of the second lubrication outlet 53 is directed. Thus, the distance between the second cooling outlet 54 and the point at which the oil discharged from the second cooling outlet 54 contacts the power roller 34 is smaller than the distance between the second lubrication outlet 53 and the second contact interface H3. That is, the distance that the oil discharged from the second cooling outlet 54 moves in the air to reach the circumferential surface 34b of the power roller 34 is smaller than the distance that the oil discharged from the second lubrication outlet 53 moves in the air to reach the second contact interface H2.

The imaginary extension I4 of the axis of the second cooling outlet 54 need not be directed toward the rotational axis A2 itself of the power roller 34, and may be directed toward a point closer to the rotational axis A2 of the power roller 34 than a point toward which the imaginary extension I3 of the axis of the second lubrication outlet 53 is directed. The imaginary extension I4 of the axis of the second cooling outlet 54 need not intersect with the rotational axis A2 of the power roller 34. The direction of the imaginary extension I4 of the axis of the second cooling outlet 54 and the direction of the imaginary extension I3 of the axis of the second lubrication outlet 53 may be in any relationship so long as the imaginary extension I4 of the axis of the second cooling outlet 54 is directed toward a point closer to the rotational axis A2 of the power roller 34 than a point toward which the imaginary extension I3 of the axis of the second lubrication outlet 53 is directed. The second lubrication outlet 53 and first cooling outlet 54 may be arranged in any manner so long as the distance between the second cooling outlet 54 and the point at which the oil discharged from the second cooling outlet 54 contacts the power roller 34 is smaller than the distance between the second lubrication outlet 53 and the second contact interface H2.

In the configuration described above, a distance L2 that the oil discharged from the first and second cooling outlets 52 and 54 moves in the air to reach the circumferential surface 34b of the power roller 34 is smaller than a distance L1 that the oil discharged from the first and second lubrication outlets 51 and 53 moves in the air to reach the contact interfaces (FIG. 6). Thus, the oil discharged from the first and second cooling outlets 52 and 54 reaches the circumferential surface 34b of the distance L2 in a short time after being discharged. That is, the oil discharged from the first and second cooling outlets 52 and 54 for cooling purpose is fed directly and quickly to the circumferential surface 34b of the power roller 34 which is to be cooled. Thus, the oil discharged from the first and second cooling outlets 52 and 54 reaches the circumferential surface 34b of the power roller 34 before being scattered in the air. As such, the power roller 34 can be cooled efficiently and reliably by the oil discharged from the first and second cooling outlets 52 and 54.

The oil discharged from the first lubrication outlet 51, first cooling outlet 52, second lubrication outlet 53, and second cooling outlet 54 is more likely to be scattered with increasing distance of the movement of the discharged oil in the air. Thus, the greater the distance of the movement of the discharged oil in the air is, the greater is the amount of the oil that fails to reach the target. As such, an increase in the distance of the movement of the discharged oil in the air could lead to a reduction in cooling efficiency. In the present embodiment, a large portion of the oil discharged from the first and second cooling outlets 52 and 54 can reach the power roller 34 which is the cooling target, and a lot of oil can be fed to the cooling target. Thus, the oil can be efficiently discharged toward the circumferential surface 34b of the power roller 34. Additionally, the amount of the oil discharged from the first and second cooling outlets 52 and 54 can be made suitable for cooling of the power roller 34.

The oil discharged from the first and second lubrication outlets 51 and 53 is fed directly toward the first and second contact interfaces H1 and H2. Thus, the oil for lubrication can be efficiently discharged toward the first and second contact interfaces H1 and H2, and this ensures lubrication at the contact interface between the input disc 26 and the power roller 34 and at the contact interface between the output disc 27 and the power roller 34. Additionally, the amount of the oil discharged from the first and second lubrication outlets 51 and 53 can be made suitable for lubrication.

In the configuration of the present embodiment, as described above, the orientations and discharge amounts of the first and second lubrication outlets 51 and 53 and the first and second cooling outlets 52 and 54 can be set according to the respective purposes of the first and second lubrication outlets 51 and 53 and the first and second cooling outlets 52 and 54. Thus, lubrication between the input disc 26 and the power roller 34, lubrication between the output disc 27 and the power roller 34, and cooling of the power roller 34 can be individually optimized.

The power roller 34 rotates in a direction D1 (FIG. 5), and the first cooling outlet 52 is located upstream of the first lubrication outlet 51 in the rotational direction D1 of the power roller 34. Thus, the oil discharged from the first cooling outlet 52 contacts the power roller 34 at a point upstream of a point at which the oil discharged from the first lubrication outlet 51 contacts the power roller 34. Likewise, the second cooling outlet 54 is located upstream of the second lubrication outlet 53 in the rotational direction of the power roller 34. Thus, the oil discharged from the second cooling outlet 54 contacts the power roller 34 at a point upstream of a point at which the oil discharged from the second lubrication outlet 53 contacts the power roller 34.

The oil is discharged from the first cooling outlet 52 at a more upstream point in the rotational direction D1 of the power roller 34 than from the first lubrication outlet 51. Thus, the oil discharged from the first cooling outlet 52 at the upstream point can be made to collide with the power roller 34 in the vicinity of a disengagement point immediately downstream of an engagement region where the output disc 27 and power roller 34 are in contact. In general, the temperature of the power roller 34 is the highest in the vicinity of the disengagement point which, in the rotational direction of the power roller 34, is immediately downstream of the engagement region where the power roller 34 is in contact with the disc. To cool the power roller 34, the oil is discharged toward the highest-temperature region of the power roller 34. This enhances the efficiency of cooling of the circumferential surface 34b of the power roller 34.

Further, in the present embodiment, the oil is discharged from the second cooling outlet 54 at a more upstream point in the rotational direction of the power roller 34 than from the second lubrication outlet 53. Thus, the oil discharged from the second cooling outlet 54 at the upstream point can be made to collide with the power roller 34 in the vicinity of a disengagement point immediately downstream of an engagement region where the input disc 26 and power roller 34 are in contact. This enhances the efficiency of cooling of the circumferential surface 34b of the power roller 34.

In the present embodiment, the opening area of the first cooling outlet 52 is larger than the opening area of the first lubrication outlet 51, and the opening area of the second cooling outlet 54 is larger than the opening area of the second lubrication outlet 53. Thus, the amount of the oil discharged for cooling of the power roller 34 is greater than the amount of the oil discharged for lubrication between the input disc 26 and the power roller 34 or between the output disc 27 and power roller 34. Thus, the power roller 34, which could become hot, can be sufficiently cooled while proper lubrication is achieved at the contact interface between the input disc 26 or output disc 27 and the power roller 34. This allows for increased rotational speed of the transmission 3.

The efficiency of the oil feed by the first and second cooling outlets 52 and 54 to the power roller 34 increases as the distance to the circumferential surface 34b of the power roller 34 decreases. Thus, this distance is preferably small in terms of cooling of the power roller 34. However, if the distance from each of the first and second cooling outlets 52 and 54 to the circumferential surface 34b of the power roller 34 is further decreased from a given distance, the further decrease in distance could not provide additional enhancement of the cooling efficiency. In case that the distance between the first cooling outlet 52 and the circumferential surface 34b of the power roller 34 or between the second cooling outlet 54 and the circumferential surface 34b of the power roller 34 is extremely small, the oil violently collides with the circumferential surface 34b of the power roller 34 and is accordingly scattered. This could result in a failure to further enhance the efficiency of cooling with the oil. Thus, in the present embodiment, the distance between the first cooling outlet 52 and the circumferential surface 34b of the power roller 34 is greater than 0.7 times the diameter of the first cooling outlet 52. Likewise, the distance between the second cooling outlet 54 and the power roller 34 is greater than 0.7 times the diameter of the second cooling outlet 54. Thus, the scattering of the oil can be reduced to reliably cool the power roller 34.

In the present embodiment, the outlets 51 and 53 for lubrication and the outlets 52 and 54 for cooling are included in the holder 40 rotatably holding the power roller 34. Thus, the element including the outlets 51 to 54 can be used also to hold the power roller 34. This leads to simplification and downsizing of the configuration of the transmission 3 and at the same time to reduction of the manufacturing cost of the transmission 3. In particular, in the present embodiment, the outlets 51 and 53 for lubrication and the outlets 52 and 54 for cooling are included in the beam 32. Thus, the outlets 51 to 54 can be easily arranged in proximity to the power roller 34. This leads to efficient discharge of the oil toward the targets.

In the present embodiment, the first lubrication outlet 51 and first cooling outlet 52 are located closer to one longitudinal end of the beam 32 than the rotational axis A2 of the power roller 34, and the second lubrication outlet 53 and second cooling outlet 54 are located closer to the other longitudinal end of the beam 32 than the rotational axis A2 of the power roller 34. This makes it possible to properly lubricate the input and output discs 26 and 27 and at the same time effectively cool the power roller 34 from the opposite directions. Thus, the configuration for sufficient lubrication and cooling can easily be constructed, and the transmission 3 can be downsized. Additionally, the manufacturing cost of the transmission 3 can be reduced.

In the present embodiment, the aircraft electricity generation apparatus 1 includes the transmission 3 as described above. Thus, downsizing and cost reduction of the aircraft electricity generation apparatus 1 can be achieved.

Although in the embodiment described above, the first lubrication outlet 51 and first cooling outlet 52 are located toward one longitudinal end of the beam 32, and the second lubrication outlet 53 and second cooling outlet 54 are located toward the other longitudinal end of the beam 32, the present invention is not limited to this configuration of the above embodiment. For example, an outlet for lubrication between the disc and the power roller and an outlet for cooling of the power roller may be located toward the one longitudinal end of the beam 32, and only these outlets may be disposed as outlets for lubrication and cooling. For example, only the first lubrication outlet 51 and first cooling outlet 52 located toward the one longitudinal end of the beam 32 may be disposed as outlets for lubrication and cooling. The first lubrication outlet 51 and first cooling outlet 52 may be located toward the one longitudinal end of the beam 32, and an outlet of a known form may be located toward the other longitudinal end of the beam 32.

Although in the embodiment described above, the first lubrication outlet 51, first cooling outlet 52, second lubrication outlet 53, and second cooling outlet 54 have a circular shape, these outlets 51 to 54 may have a non-circular shape (such as a square shape). In the case where the first cooling outlet 52 has a non-circular shape, the distance between the first cooling outlet 52 and the circumferential surface 34b of the power roller 34 may be greater than 0.7 times the hydraulic diameter of the first cooling outlet 52. Likewise, in the case where the second cooling outlet 54 has a non-circular shape, the distance between the second cooling outlet 54 and the power roller 34 may be greater than 0.7 times the hydraulic diameter of the second cooling outlet 54.

The hydraulic diameter is a parameter expediently used as an equivalent diameter of the first or second cooling outlet 52 or 54 when the cross-section of the channel having the outlet 52 or 54 is non-circular. The hydraulic diameter Dh is defined by the following equation: $Dh=4S/Lp$, wherein S is the cross-sectional area of the channel, and Lp is the inner perimeter (wetted perimeter) of the channel.

Although in the embodiment described above, the outlets 51 to 54 are included in the beam 32, the present invention is not limited to this configuration of the above embodiment. The outlets 51 to 54 may be included in an element other than the beam 32. In this case, the outlets 51 to 54 may be included in an element of the holder 40 that is other than the beam 32. For example, the outlets 51 to 54 may be included in the trunnion 31. The oil passages for delivering the oil to the outlets 51 to 54 need not be included in the beam 32, and may be included in the trunnion 31.

The element including the outlets 51 to 54 may be other than the holder 40. The lubrication outlet 51 or 53 may be at any location so long as the oil can be discharged from the lubrication outlet 51 or 53 toward the contact interface between the input disc 26 or output disc 27 and the power roller 34 for lubrication purpose. The cooling outlet 52 or 54 may be at any location so long as the oil can be discharged toward the circumferential surface 34b of the power roller 34 to cool the power roller 34. The oil may be discharged from an element other than the speed change unit 29 and, for example, the casing 6 may include the outlets for oil discharge.

Although in the embodiment described above, the opening area of the first cooling outlet 52 is larger than the opening area of the first lubrication outlet 51, the present invention is not limited to this configuration of the above embodiment. The opening area of the first lubrication outlet 51 may be equal to the opening area of the first cooling outlet 52. The opening area of the first lubrication outlet 51 may be larger than the opening area of the first cooling outlet 52. Although in the embodiment described above, the opening area of the second cooling outlet 54 is larger than the opening area of the second lubrication outlet 53, the present invention is not limited to this configuration of the above embodiment. The opening area of the second lubrication outlet 53 may be equal to the opening area of the second cooling outlet 54 or may be larger than the opening area of the second cooling outlet 54. The oil passages for delivering the oil to the lubrication outlets 51 and 53 may be separate from the oil passages for delivering the oil to the cooling outlets 52 and 54.

The invention claimed is:

1. A toroidal continuously variable transmission comprising:
   input and output discs opposed to each other;
   a power roller tiltably held between the input and output discs to transmit rotational drive power of the input disc to the output disc at a speed ratio determined by a tilt angle of the power roller;
   at least one lubrication outlet that discharges an oil toward at least one contact interface between the input or output disc and the power roller; and
   at least one cooling outlet that discharges the oil toward the power roller, wherein
   the cooling outlet and the lubrication outlet are arranged such that when the power roller is viewed along a rotational axis of the power roller, an imaginary extension of an axis of the cooling outlet is directed toward a point closer to the rotational axis of the power roller than a point toward which an imaginary extension of an axis of the lubrication outlet is directed and that a distance between the cooling outlet and a point at which the oil discharged from the cooling outlet contacts the power roller is smaller than a distance between the lubrication outlet and the contact interface.

2. The toroidal continuously variable transmission according to claim 1, wherein a distance between the cooling outlet and the power roller is greater than 0.7 times a diameter or a hydraulic diameter of the cooling outlet.

3. The toroidal continuously variable transmission according to claim 1, further comprising a holder rotatably supporting the power roller, wherein
   the lubrication outlet and the cooling outlet are included in the holder.

4. The toroidal continuously variable transmission according to claim 3, wherein
   the holder includes a trunnion tiltably holding the power roller and a beam mounted on the trunnion,
   the trunnion includes a base on which the power roller is rotatably mounted and a pair of side walls rising from the base, the side walls being opposed across the power roller in an axial direction of a tilt shaft of the power roller and facing a circumferential surface of the power roller,
   the beam is located across the power roller from the base, extends in the axial direction of the tilt shaft, and is mounted on the pair of side walls, and
   the lubrication outlet and the cooling outlet are included in the beam.

5. The toroidal continuously variable transmission according to claim 1, wherein the cooling outlet is located upstream of the lubrication outlet in a rotational direction of the power roller.

6. The toroidal continuously variable transmission according to claim 1, wherein an opening area of the cooling outlet is larger than an opening area of the lubrication outlet.

7. A drive mechanism-integrated electricity generation apparatus for an aircraft, comprising:
   the toroidal continuously variable transmission according to claim 1;
   an input mechanism that inputs rotational drive power from a rotational shaft of an engine of the aircraft to the toroidal continuously variable transmission; and
   an electricity generator driven by output of the toroidal continuously variable transmission.

8. A toroidal continuously variable transmission comprising:
   input and output discs opposed to each other;
   a power roller tiltably held between the input and output discs to transmit rotational drive power of the input disc to the output disc at a speed ratio determined by a tilt angle of the power roller;
   at least one lubrication outlet that discharges an oil toward at least one contact interface between the input or output disc and the power roller;
   at least one cooling outlet that discharges the oil toward the power roller; and
   a holder rotatably supporting the power roller, wherein
   the cooling outlet and the lubrication outlet are arranged such that a distance between the cooling outlet and a point at which the oil discharged from the cooling outlet contacts the power roller is smaller than a distance between the lubrication outlet and the contact interface,
   the lubrication outlet and the cooling outlet are included in the holder,
   the holder includes a trunnion tiltably holding the power roller and a beam mounted on the trunnion,
   the trunnion includes a base on which the power roller is rotatably mounted and a pair of side walls rising from the base, the side walls being opposed across the power roller in an axial direction of a tilt shaft of the power roller and facing a circumferential surface of the power roller,
   the beam is located across the power roller from the base, extends in the axial direction of the tilt shaft, and is mounted on the pair of side walls,
   the lubrication outlet and the cooling outlet are included in the beam,
   the at least one contact interface includes a first contact interface between the input disc and the power roller and a second contact interface between the output disc and the power roller,
   the at least one lubrication outlet includes a first lubrication outlet that feeds the oil toward the first contact interface and a second lubrication outlet that feeds the oil toward the second contact interface,
   the at least one cooling outlet includes a first cooling outlet and a second cooling outlet, the first lubrication outlet and the first cooling outlet are located closer to one end of the beam than a rotational axis of the power roller, and the second lubrication outlet and the second cooling outlet are located closer to the other end of the beam than the rotational axis of the power roller.

\* \* \* \* \*